Oct. 2, 1962 P. GRAHAM 3,056,462
CURVED VEHICLE BUMPER
Filed March 13, 1958

INVENTOR.
BY Phillip Graham
William J. Ruano
ATTORNEY

United States Patent Office 3,056,462
Patented Oct. 2, 1962

3,056,462
CURVED VEHICLE BUMPER
Phillip Graham, 2883 W. Liberty Ave., Pittsburgh 16, Pa.
Filed Mar. 13, 1958, Ser. No. 721,150
12 Claims. (Cl. 180—83)

This invention relates to a barrier in the form of a cushioning shield, such as a vehicle bumper, which is curved like a bow, yieldable to change its degree of bowed curvature when subjected to loads, light in weight, and strong.

This invention is a continuation-in-part of my co-pending application Serial No. 557,938, filed January 9, 1956, entitled Safe Conveyance Body, now Patent No. 2,916,324.

A barrier embodying the principles of this invention offers protection against violent forces that may be thrust against it. A small amount of material is shaped for optimum use to provide a safety barrier that can offer security against possible fatal injury and property damage from violent forces. In general, the parts are confined and forced to work efficiently. The barriers may be mounted like bumpers so that minor collision impacts against them are absorbed with a cushioning action. More violent collision impacts are cushionably absorbed to an extent, then the remainder of the force is diverted downwardly into the roadway and upwardly in a lifting action of a portion of the vehicle. The diverting action is a toggle-like action that can divert tremendous forces.

An object of my invention is to provide a bumper-like barrier that can cushion and absorb a portion of a violent collision impact against it and divert the remainder of the force into the roadway and into lifting action.

A further object of my invention is to provile a cushionable barrier that is curved like a bow in width and slightly bowed longitudinally, the panel of the barrier being made of material that will compress enough under impacts to allow the width bow to yield readily and flatten to an extent.

Our objects of my invention will become more apparent from the following description, taken with the accompanying drawings wherein.

Figure 1:
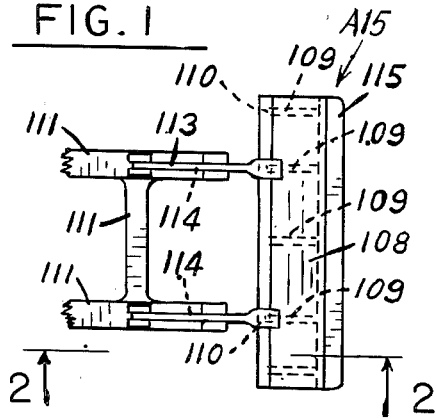
FIGURE 1 is a fragmentary plan view showing a paneled barrier mounted on an end automobile in place of a common bumper.

A bumper-like barrier A15, shown in FIGURE 1, may be attached to the front, rear, or side of an automobile or the like. The barrier has a bowed panel 108 that can yield and flatten to an extent when its convex surface collides with an object such as another auto. There are yieldable ribs or shafts 109 that prevent the panel 108 from buckling under an impact. The panel 108 may have a shorter arc than the ribs 109.

There is yieldable tie means 110 across the chord of the panel 108 and the ribs 109. The barrier A15 is attached to the chassis 111 with bolts or the like. The auto body is not shown. The barrier A15 may be tilted, as shown, with respect to the roadway 112, so a low impact will have more tendency to flatten the panel 108. A pair of rigid supports 113 have pivotal attachments to the top of the barrier. Each of a pair of pivotal links 114 are pivotally engaged to the chassis 111, the bottom of the panel 108, and the rib 109. A beam 115 may be attached to the convex surface of the panel 108 to act as a buffer to engage the other auto or the like during an accident. The panel 108 may be fastened to ribs 109 with clevises like panels and ribs are connected as shown in my Patent No. 2,827,305. The clevises may have rivets or bolts long enough to engage and fasten the beam 115 to the ribs and panel. If preferred, the panel 108 may be fastened with wires to the ribs 109 like a bowed shell is connected to ribs as shown in my Patent No. 2,916,324. Also, if preferred, the beam 115 may be bolted to the panel 108 as the bumper-like pads are attached to a bowed shell as shown in Patent No. 2,916,324.

The ends of the yieldable tie means 110 may be attached to the supports 113 and the links 114 similar to the arrangement shown in Patent No. 2,916,324.

Figure 3:
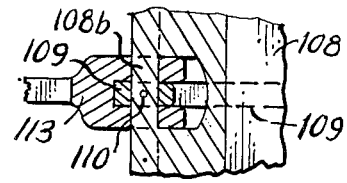
FIGURE 3 is an enlarged sectional view taken along line 3—3 of FIGURE 2.

FIG. 3 shows how the panel 108, a rib 109, a tie 110, and a support 113 may be connected at the top of the barrier A15. The panel 108 has a slot at each connection to allow a rib 109 and a support 113 to encircle a pin-like portion 108b of the panel 108. The pin-like portion 108b may be made of metal which can be attached to the remainder of the panel 108. The top of each support 113 is closed to form a socket-like recess in which the upper end of each rib 109 may pivot if the pin-like portion 108b fails.

Each tie 110 projects through the upper end of a rib 109 and the pin-like portion 108b, allowing it to be anchored to the support 113. The holes for the tie 110 may be countersunk to allow the tie to bend, thus preventing the tie from shearing when the panel 108 flattens.

The bottom of the panel 108 may be connected to the bottoms of the ribs 109 and links 114 like the top portions are connected as shown in FIG. 3.

The bowed panel 108 is like the bowed panels described in my Patents, No. 2,827,305, and No. 2,916,324.

The ribs 109 are formed of stiff linked members that may be made of strong stiff plastic with metal reinforcing. Such ribs are clearly described in my Patents, No. 2,827,305, and No. 2,916,324. The beam 115 spreads in a collision impact so that both sides of the chassis 111 are brought into play.

When there is a very violent collision between the convex surface of the panel 108 and another auto or the like, the panel 108 and the ribs 109 flatten to an extent; the yieldable tie means 110 absorbs and cushions much of the thrust that diverts into the ends of the panel and ribs. When the thrust is so great that the tie means 110 cannot absorb it, the panel and ribs flatten until their bottom portions strike the roadway 112, thus diverting much of the collision force into the roadway 112. Since the upper portion of the panel and the ribs are not free to move away from the chassis 111, the collision force diverted upwards in the panel and ribs, tends to raise the vehicle after the barrier has struck the roadway 112, thus absorbing much collision force with the lifting action.

Figure 2:
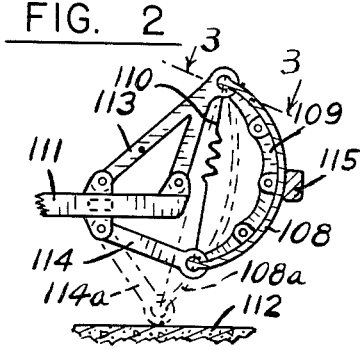
FIGURE 2 is a fragmentary sectional view taken along line 2—2 of FIGURE 1.

When the barrier collides violently with another auto, the other auto is likely to snag into the barrier, thus the lifting action of the barrier would also cause lifting action of the other auto, which would absorb more of the collision force. The barrier acts like a toggle to divert the thrust downwardly and upwardly. The flattened barrier is shown by a phantom dot-dash outline in FIGURE 2, the flattened panel 108 being indicated by the outline portion 108a and the downward position of the link 114 being indicated by the outline portion 114a. The barrier A15 is expendable against very violent collision forces, to cushion the forces and to prevent damage to the auto, and thus shield the auto's occupants.

The raising of the auto wheels at the point of a collision impact causes less tire friction to the roadway and allows the raised auto to be pushed backwards by a colliding auto or truck which has more momentum. During a collision with a truck or the like, the lifting action tends to raise a small auto, thus tending to prevent the truck or the like from riding over top of the barrier equipped auto.

The barrier A15 is almost centered with the chassis 111 when the barrier is flattened to a great extent. The diagonal links 114 and the long diagonal portions of the supports 113 carry almost equal thrusts back to the chassis 111, thus tending to restrain the chassis from bending. A very violent lifting action would tend to bend the ends of the chassis upwardly, thus the repairable ends of the chassis are expendable to save the remainder of auto and the occupants.

The panel 108 may be made of strong plastic which has only slight flexibility. The plastic may be reinforced with fiber glass and/or metal. Brittle plastic that cracks when bent and thus is expendable, may be used along with a binder such as a sheet metal skin or strands of fiber glass and/or wires. Such a panel would crack and the broken pieces that are bonded together would act like stones in a stone arch to carry the thrusts to the top and bottom of the barrier. Force would be absorbed by the cracking or breaking action of the panel. Such a panel may be used without yieldable tie means.

The yieldable tie 110 may be made so there is spring action and/or tearing or rupturing of the metal to allow force absorbing yielding.

Figure 4:
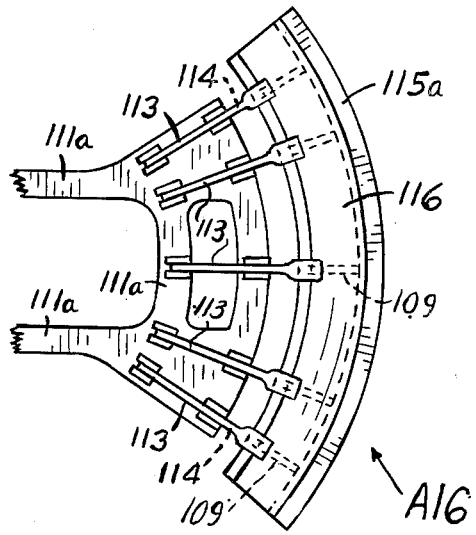
FIGURE 4 is a fragmentary plan view similar to FIGURE 1 but showing a barrier that is curved in width and length.

A bumper-like barrier A16, shown in FIGURE 4, is curved longitudinally and transversely. The barrier A16 is like the barrier A15, it differs with its longitudinal curvature and its five supports 113 and five links 114. The beam 115a is similar to beam 115; it differs by its being curved in length. The barrier has a dished or two way curved panel 116 which is similar to the bowed panel 108. The plastic panel is compressible to allow it to flatten to an extent before it starts to rupture. The chassis 111a differs from chassis 111 at the end to allow the five supports and links to be attached to it. Barrier A16 is shaped and positioned to allow it to take a collision thrust from an angle, to spread the force into a very wide area of the panel 116, to resist the force with considerable yieldable tie means, and to divert the remainder of the force into the roadway 112 and to lifting action of the vehicle at the collision point.

Figure 5:
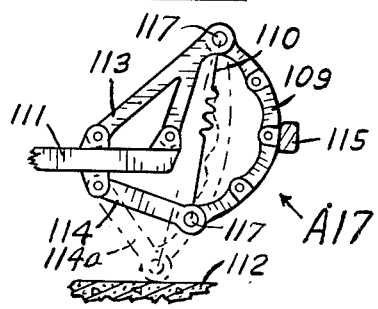
FIGURE 5 is a fragmentary sectional view similar to FIGURE 2, but showing a barrier with yieldable ribs and without a panel.

FIGURE 5 shows an elevational view of a bumper-like barrier A17. The barrier A17 is similar to the barrier A15 or the barrier A16. It differs by not having a panel. The ribs 109 take collision thrusts on their convex edges. A beam 115 may be used to spread a collision thrust against it to bring more ribs into play. The beam 115 is weakly fastened to the ribs 109, so a beam connection to a rib will yield and not restrain the rib from flattening from a localized impact against the rib. Short pins 117 connect each rib 109 to a support 113 and a link 114, each pin 117 being similar to the pin-like portion 108b shown in FIG. 3.

While I have illustrated and described several specific embodiments of my invention, it will be understood that these are by way of illustration only, and that various changes and modifications may be made within the contemplation of my invention and within the scope of the following claims.

I claim:

1. In combination with a vehicle having a rigid framework, a bumper comprising a stiff, yieldable shaft means outwardly arched throughout in a vertical plane, fixed pivotal bearing means rigidly attached to said framework, said fixed pivotal bearing means pivotally engaging the upper end portion of said shaft means, a yieldable bearing means mounted on said framework, said yieldable bearing means engaging the lower portion of said shaft means so as to permit the lower portion of said shaft means to move downwardly away from said upper end portion and strike against the roadway surface as the result of impact of an object against the outer surface of said shaft means which results in partial flattening of said shaft means, causing said upper end portion to rise and tend to raise the adjacent portion of said vehicle away from said roadway surface, causing lifting action which absorbs much of the remainder of said impact, thereby cushioning the said impact, said yieldable bearing means includes pivotal link means having one end portion pivotally engaged to said framework inwardly away from said shaft means, and the other end portion pivotally engaging said lower portion, whereby when said lower portion is stressed by said impact, said link means braces said lower portion.

2. The combination recited in claim 1, wherein said shaft means is arched like a bow having a substantially constant radius of curvature throughout.

3. The combination as recited in claim 1, together with a yieldable tie means having a lower tie portion engaging the said lower portion of said shaft means and an upper tie portion fixed relative to said framework so that it cannot yield with respect to said vehicle, whereby when said shaft means is flattened by said impact, some of the said impact is expended in causing the said yieldable tie means to yield.

4. The combination recited in claim 3, wherein said yieldable tie means includes spring means to absorb some of said impact.

5. The combination recited in claim 1, wherein said shaft means being two shafts in spaced relationship, together with a horizontal beam attached to an intermediate portion of said outer surface, whereby said impact can be made against the outer surface of said beam midway between the said two shafts, and distributed to said two shafts to cause them to coact.

6. The combination as recited in claim 5, wherein said two shafts extend radially towards a point on said vehicle, whereby a collision from an angle is resisted.

7. The combination as recited in claim 2, wherein said shaft means are two shafts in spaced relationship, together with an outwardly bowed slightly flexible panel of substantially constant radius of curvature throughout and in a vertical plane extended horizontally, said bowed panel fastened to said outer surface of said shaft means, whereby said impact against said panel causes said panel to flatten to an extent as it spreads the said impact into the said two shafts.

8. The combination recited in claim 5, together with a yieldable tie means having a lower tie portion engaging the said lower portion of said shaft means and an upper tie portion fixed relative to said framework so that it cannot yield with respect to said vehicle, whereby when said shaft means is flattened by said impact, some of the said impact is expended in causing the said yieldable tie means to yield.

9. The combination recited in claim 7, wherein said panel is outwardly bowed in both a horizontal and vertical direction and wherein said two shafts extend radially towards a point on said vehicle, whereby a collision from an angle is resisted.

10. The combination as recited in claim 7, together with a yieldable tie means having a lower tie portion engaging the said lower portion of said shaft means and an upper tie portion fixed relative to said framework so that it cannot yield with respect to said vehicle, whereby when said shaft means is flattened by said impact, some of the said impact is expended in causing the said yieldable means to yield.

11. The combination as recited in claim 10, wherein said yieldable tie means includes spring means to absorb some of said impact.

12. The combination as recited in claim 10, wherein said panel is outwardly bowed in both a horizontal and vertical direction and wherein said two shafts extend radially towards a point on said vehicle, whereby a collision from an angle is resisted.

References Cited in the file of this patent

UNITED STATES PATENTS

| | | |
|---|---|---|
| 2,156,178 | Gyure | Apr. 25, 1939 |
| 2,740,642 | Atwood | Apr. 3, 1956 |
| 2,798,262 | Beamer | July 9, 1957 |
| 2,826,787 | Graham | Mar. 18, 1958 |
| 2,827,305 | Graham | Mar. 18, 1958 |
| 2,843,224 | Landman et al. | July 15, 1958 |
| 2,916,324 | Graham | Dec. 8, 1959 |